United States Patent [19]

Tiefensee et al.

[11] Patent Number: 5,576,385
[45] Date of Patent: Nov. 19, 1996

[54] TRANSPARENT, IMPACT-RESISTANT MOLDING MATERIALS HAVING HIGH STRESS CRACKING RESISTANCE AND A DULL SURFACE

[75] Inventors: Kristin Tiefensee, Westheim; Norbert Guntherberg, Speyer; Rainer Neumann, Mutterstadt; Ekkehard Jahns, Hirschberg, all of Germany

[73] Assignee: BASF Aktiengesellschaft, Ludwigshafen, Germany

[21] Appl. No.: 520,697

[22] Filed: Aug. 29, 1995

[30] Foreign Application Priority Data

Sep. 6, 1994 [DE] Germany ................. 44 31 732.8

[51] Int. Cl.⁶ ..................................... C08L 51/04
[52] U.S. Cl. ........................ 525/77; 525/78; 525/79; 525/80; 525/83; 525/84; 525/85; 525/221; 525/222; 525/223; 525/228; 525/230
[58] Field of Search ................ 525/77, 78, 79, 525/80, 83, 84, 85, 221, 222, 223, 228, 230

[56] References Cited

U.S. PATENT DOCUMENTS

| | | | |
|---|---|---|---|
| 4,393,164 | 7/1983 | McKee et al. | 525/83 |
| 4,612,347 | 9/1986 | Eichenauer et al. | 525/73 |
| 5,457,055 | 12/1995 | Deckers et al. | 525/77 |
| 5,457,157 | 10/1995 | Deckers et al. | 525/80 |

FOREIGN PATENT DOCUMENTS

| | | |
|---|---|---|
| 2075216 | 2/1993 | Canada. |
| 62223 | 10/1982 | European Pat. Off.. |
| 599067 | 6/1994 | European Pat. Off.. |

OTHER PUBLICATIONS

Chem. Abst. 94–199550.
Chem. Abst. 94–169424/21.

*Primary Examiner*—Edward J. Cain
*Attorney, Agent, or Firm*—Keil & Weinkauf

[57] ABSTRACT

Thermoplastic molding materials containing a mixture of
(A) from 15 to 70% by weight of a methacrylate polymer,
(B) from 10 to 50% by weight of a copolymer obtained by polymerization of a mixture of
 (B1) a vinylaromatic monomer and
 (B2) a vinyl cyanide,
(C) from 20 to 50% by weight of a graft copolymer of
 (C1) 50–80% by weight of a core of
  (C11) from 50 to 100% by weight of a 1,3-diene and
  (C12) from 0 to 50% by weight of a vinylaromatic monomer and
 (C2) 20–50% by weight of a graft shell of
  (C21) a $C_1$–$C_8$-alkyl ester of methacrylic or acrylic acid and
  (C22) a vinylaromatic monomer,
with the proviso that the medium particle size ($d_{50}$) of the graft copolymer is chosen in the range from 40 to 500 nm, and
(D) from 0.5 to 15% by weight of a crosslinked methacrylate polymer.

3 Claims, No Drawings

TRANSPARENT, IMPACT-RESISTANT MOLDING MATERIALS HAVING HIGH STRESS CRACKING RESISTANCE AND A DULL SURFACE

The present invention relates to thermoplastic molding materials containing a mixture comprising essentially (A) from 15 to 70% by weight of a methacrylate polymer obtainable by polymerization of a mixture consisting essentially of
  (A1) from 90 to 100% by weight, based on (A), of methyl methacrylate and
  (A2) from 0 to 10% by weight, based on (A), of a $C_1$–$C_8$-alkyl ester of acrylic acid, and
(B) from 10 to 50% by weight of a copolymer obtainable by polymerization of a mixture consisting essentially of
  (B1) from 78 to 88% by weight, based on (B), of a vinylaromatic monomer and
  (B2) from 12 to 22% by weight, based on (B), of a vinyl cyanide, and
(C) from 20 to 50% by weight of a graft copolymer obtainable essentially from
  (C1) 50 to 80% by weight of a core obtainable by polymerization of a monomer mixture consisting essentially of
    (C11) from 50 to 100% by weight of a 1,3-diene and
    (C12) from 0 to 50% by weight of a vinylaromatic monomer and
  (C2) 20 to 50% by weight of a graft shell obtainable by polymerization of a monomer mixture in the presence of the core (C1) consisting essentially of
    (C21) from 40 to 100% by weight of a $C_1$–$C_8$-alkyl ester of methacrylic or acrylic acid and
    (C22) from 0 to 60% by weight of a vinylaromatic monomer, with the proviso that the median particle size ($d_{50}$) of the graft copolymer is chosen in the range from 40 to 500 nm, and
(D) from 0.5 to 15% by weight of a crosslinked methacrylate polymer obtainable by polymerization of a mixture consisting essentially of
  (D1) from 80 to 99.5% by weight of a $C_1$–$C_8$-alkyl ester of methacrylic acid,
  (D2) from 0 to 15% by weight of a $C_1$–$C_8$-alkyl ester of acrylic acid,
  (D3) from 0.5 to 5% by weight of a crosslinking monomer copolymerizable with D1 and D2 and
  (D4) from 0 to 10% by weight of a polar momoner selected from the group consisting of methacrylic acid, acrylic acid, hydroxyethyl acrylate, hydroxyethyl methacrylate, dimethylaminoethyl acrylate and dimethylaminoethyl methacrylate,
with the proviso that the median particle size ($d_{50}$) of D is chosen in the range from 50 to 80,000 nm, and
(E) from 0 to 20% by weight of conventional additives, based on the sum of the components A, B, C and D, where the stated % by weight of A, B, C and D sum to 100 and the difference between the refractive index of the component C and that of the mixture of the components A, B and D or that of the mixture of the components A, B, D and E is less than 0.005.

The present invention furthermore relates to a process for the preparation of the novel thermoplastic molding materials, their use and moldings therefrom.

EP-A-62 223 describes highly glossy, transparent, impact-resistant, thermoplastic molding materials comprising a hard methyl methacrylate polymer, a hard styrene/acrylonitrile polymer and a soft graft copolymer of alkyl (meth)acrylate and, if required, styrene on a rubber.

DE-A 41 25 857 describes dull films comprising polymethyl methacrylate (PMMA) obtained by adding crosslinked methacrylate particles. For many applications, however, the toughness and the stress cracking resistance are insufficient.

It is an object of the present invention to provide further thermoplastic molding materials which are based on PMMA and styrene/acrylonitrile (SAN) polymers and are dull and at the same time have high stress cracking resistance and toughness.

We have found that this object is achieved by the thermoplastic molding materials defined at the outset.

We have also found a process for their preparation, their use for the production of moldings, and moldings produced from the novel thermoplastic molding materials.

The novel thermoplastic molding materials contain essentially
(A) from 15 to 70, preferably from 30 to 60, % by weight of a methacrylate polymer obtainable by polymerization of a mixture consisting essentially of
  (A1) from 90 to 100, preferably from 93 to 97, % by weight, based on (A), of methyl methacrylate and
  (A2) from 0 to 10, preferably from 3 to 7, % by weight, based on (A), of a $C_1$–$C_8$-alkyl ester of acrylic acid, with the proviso that the viscosity number is chosen in the range from 55 to 60, preferably from 56 to 58 (measured in a 0.5% strength by weight solution in dimethylformamide at 23° C.), and
(B) from 10 to 50, preferably from 10 to 40, % by weight of a copolymer obtainable by polymerization of a mixture consisting essentially of
  (B1) from 78 to 88, preferably from 78 to 84, % by weight, based on (B), of a vinylaromatic monomer and
  (B2) from 12 to 22, preferably from 16 to 22, % by weight, based on (B), of a vinyl cyanide, and
(C) from 20 to 50, preferably from 30 to 40, % by weight of a graft copolymer obtainable essentially from
  (C1) 50 to 80, preferably 55 to 70, % by weight of a core obtainable by polymerization of a monomer mixture consisting essentially of
    (C11) from 50 to 100, preferably from 60 to 80, % by weight of a 1,3-diene and
    (C12) from 0 to 50, preferably from 20 to 40, % by weight of a vinylaromatic monomer and
  (C2) from 20 to 50, preferably from 30 to 45, % by weight of a graft shell, obtainable by polymerization of a monomer mixture in the presence of the core (C1), consisting essentially of
    (C21) from 40 to 100, preferably from 50 to 80, % by weight of a $C_1$–$C_8$-alkyl ester of methacrylic or acrylic acid and
    (C22) from 0 to 60, preferably from 20 to 50, % by weight of a vinylaromatic monomer,
with the proviso that the median particle size ($d_{50}$) of the graft copolymer is chosen in the range from 40 to 500 nm, preferably from 50 to 300 nm, and
(D) from 0.5 to 15, preferably from 2 to 10, % by weight of a crosslinked methacrylate polymer obtainable by polymerization of a mixture consisting essentially of
  (D1) from 80 to 99.5, preferably from 85 to 99, % by weight of a $C_1$–$C_8$-alkyl ester of methacrylic acid,
  (D2) from 0 to 15, preferably from 0 to 12, % by weight of a $C_1$–$C_8$-alkyl ester of acrylic acid,
  (D3) from 0.5 to 5, preferably from 1.5 to 5, % by weight of a crosslinking monomer copolymerizable with D1 and D2 and
  (D4) from 0 to 10, preferably from 0 to 8, % by weight of a polar momoner selected from the group consisting of methacrylic acid, acrylic acid, hydroxyethyl acrylate, hydroxyethyl methacrylate, dimethylaminoethyl acrylate and dimethylaminoethyl methacrylate, with the proviso that the median particle size ($d_{50}$) of D is chosen in the range from 50 to 80,000 nm, preferably from 100 to 60,000 nm, and (E) from 0 to 20, preferably from 0 to 10, % by weight of conventional additives, based on the sum of the components A, B, C and D, where the stated % by weight of A, B, C and D sum to 100 and the difference between the refractive index of the component C and that of the mixture of the components A, B and D or that of the mixture of the components A, B, D and E is less than 0.005.

Methyl acrylate, ethyl acrylate, propyl acrylate, n-butyl acrylate, n-pentyl acrylate, n-hexyl acrylate, n-heptyl acrylate, n-octyl acrylate and 2-ethylhexyl acrylate and mixtures thereof, preferably methyl acrylate, n-butyl acrylate, 2-ethylhexyl acrylate or mixtures thereof, particularly preferably methyl acrylate, may be used as $C_1$–$C_8$-alkyl esters of acrylic acid (component A2).

The methyl methacrylate (MMA) polymer can be prepared by mass, solution or bead polymerization by known methods (cf. for example Kunststoff-Handbuch, Volume IX, Polymethacrylate, Vieweg/Esser, Carl-Hanser-Verlag 1975) and are commercially available. Methacrylate polymers whose weight average molecular weight is from 60,000 to 300,000 (determined by light scattering in chloroform) are preferably used.

Styrene which is unsubstituted or monosubstituted to trisubstituted by $C_1$–$C_8$-alkyl, such as p-methylstyrene or tert-butylstyrene, and α-methylstyrene, preferably styrene, may be used as vinylaromatic monomers (component B1).

Acrylonitrile and/or methacrylonitrile, preferably acrylonitrile, may be used as vinyl cyanide (component B2).

Outside the abovementioned range of the composition of the component B, opaque molding materials which have joint lines are usually obtained at processing temperatures above 240° C.

The copolymers B can be prepared by all known processes, such as mass, solution, suspension or emulsion polymerization, preferably solution polymerization (cf. GB-A 14 72 195).

Butadiene and/or isoprene may be used as the 1,3-diene (component C11) of the core of the graft copolymer (component C1).

Styrene which is unsubstituted or substituted in the α position or preferably in the nucleus by a $C_1$–$C_8$-alkyl group (or in the nucleus by a plurality of $C_1$–$C_8$-alkyl groups), preferably by methyl, may be used as the vinylaromatic monomer (component C12).

The core of the graft copolymer preferably has a glass transition temperature of less than 0° C. and preferably possesses a median particle size of less than 200 nm, particularly preferably from 30 to 150 nm. The core is usually prepared by emulsion polymerization (cf. for example Encyclopedia of Polymer Science and Engineering, Vol. 1, page 401 et seq.).

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate or 2-ethylhexyl methacrylate, particularly preferably methyl methacrylate, and mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably n-butyl acrylate, and mixtures of these monomers with one another and with the methacrylates are used as $C_1$–$C_8$-alkyl esters of methacrylic or acrylic acid (component C21).

Styrene which is unsubstituted or monosubstituted to trisubstituted by $C_1$–$C_8$-alkyl, such as p-methylstyrene or tert-butylstyrene, and α-methylstyrene, preferably styrene, may be used as vinylaromatic monomers (component C22).

When more than one monomer is used for the graft shell, a core/shell morphology may be desirable. The various shells may have different compositions. This is achieved in general by adding different monomers (monomer mixtures) at different times during the polymerization.

The graft shell (C2) is prepared, according to the invention, in the presence of the core (C1), for example by the process described in Encyclopedia of Polymer Science and Engineering, Vol. 1, page 401 et seq.

The graft copolymer may be isolated, for example, by spray drying or by coagulation. Such products are commercially available and preferably have a median particle size ($d_{50}$) of from 40 to 500 nm, particularly preferably from 50 to 300 nm.

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate or 2-ethylhexyl methacrylate, particularly preferably methyl methacrylate, and mixtures of these monomers are used as $C_1$–$C_8$-alkyl esters of methacrylic acid (component D1).

Methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably methyl acrylate, and mixtures of these monomers with one another may be used as $C_1$–$C_8$-alkyl esters of acrylic acid (component D2).

According to the invention, di- or polyfunctional comonomers, for example alkylene glycol dimethacrylates, such as
ethylene glycol dimethacrylate, propylene glycol dimethacrylate, 1,3-butylene glycol dimethacrylate and 1,4-butylene glycol dimethacrylate,
alkylene glycol diacrylates, such as ethylene glycol diacrylate, propylene glycol diacrylate, 1,3-butylene glycol diacrylate and 1,4-butylene glycol diacrylate,
acrylates and methacrylates of glycerol, trimethylolpropane, pentaerythritol, inositol and similar sugar alcohols,
acrylamides and methacrylamides of ethylenediamine and other aliphatic di- and polyamines,
triacrylamides and trimethacrylamides,
triallyl cyanurate and triallyl isocyanurate and
vinylbenzenes, such as divinylbenzene and trivinylbenzene, are used as the copolymerizable crosslinking monomer (component D3).

Owing to their property of being uniformly incorporated into the polymeric phase, the comonomers D3 are also referred to as polymerization crosslinking agents. During the polymerization reaction, the rate at which they are consumed is essentially comparable with that of the main monomer, with the result that crosslinking takes place within the phase.

According to the invention, a monomer or a monomer mixture selected from the group consisting of methacrylic acid, acrylic acid, hydroxyethyl acrylate, hydroxyethyl methacrylate, dimethylaminoethyl acrylate and dimethylaminoethyl methacrylate is used as the polar monomer (D4).

The component D is usually prepared by a known process, for example by that described in EP-A 443 609. Other polymers which are covered by the definition of component D are commercially available.

Preferred additives are those which dissolve in the components A and B to give a clear solution. Examples are dyes, stabilizers, lubricants and antistatic agents.

The components A, B, C, D and, if desired, E are usually mixed in the melt at from 200° to 300° C., preferably from 220° to 280° C.

A requirement for the transparency of the novel molding materials is that the difference between the refractive index of the (soft) component C and that of the mixture of the (hard) components A, B and D and, if required, of the fillers E is less than 0.005. The refractive index of the mixture of the hard components A, B and D is obtained from a linear combination of the refractive indices of the individual components with their weight fractions. For a given refractive index of the soft component C, the refractive index of the hard component is adjusted by a suitable choice of the ratio (A+D):B. A further important requirement for the independence of the transparency of the processing temperature is the maintenance of the stated composition of the component B and the compatibility of the component D with the total matrix.

Moldings can be produced from the novel molding materials mainly by injection molding or blowmolding. The molding materials may also be compression molded, calendered, extruded or vacuum formed. They may be used wherever the flowability of the conventional transparent plastics is insufficient, for example in automotive rear lights, transparent household appliances, toys and coatings in conjunction with a very wide range of materials.

The processing range of the novel, transparent, thermoplastic blends above 200° C. is not restricted by incompatibility phenomena. The blends can be processed at from 200° to 300° C. without deterioration of the transparency, without marked yellowing and without the production of troublesome odors. Moldings produced by injection molding show absolutely no joint lines and have high transparency and a dull surface.

EXAMPLES

In the examples and comparative experiments which follow, ratios and percentages are by weight.

Refractive index $n_D^{25}$ was determined using an Abbé refractometer by the method for measuring the refractive indices of solids (cf. Ullmanns Encyklopädie der technischen Chemie, Volume 2/1, page 486, editor E. Foerst, Urban & Schwarzenberg, Munich-Berlin 1961).

The optical properties (gloss) were determined similarly to DIN 67 530 (at 45°). The Charpy impact strength ($a_n$) was determined according to ISO 179. The stress cracking resistance was determined similarly to DIN V EN 2155/T19 (using ethanol as the solvent).

The median particle size and the particle size distribution were determined from the integral mass distribution. The medium particle sizes are in all cases the weight average particle sizes as determined by means of an analytical ultracentrifuge by the method of W. Scholtan and H. Lange, Kolloid-Z, und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The medium particle diameter, which is also referred to as the $d_{50}$ value of the integral mass distribution, is defined as the particle diameter at which 50% by weight of the particles have a diameter smaller than the diameter which corresponds to the $d_{50}$ value. Likewise, 50% by weight of the particles have a diameter larger than the $d_{50}$ value.

The polymers defined below were used for the examples and comparative examples:

A Copolymer prepared from methyl methacrylate (MMA) and methyl acrylate (MA) in a ratio of 94:6 ($n_D^{25}$ = 1.492, $M_w$ = 110,000 g/mol);

B Copolymer prepared from styrene (S) and acrylonitrile (AN) in a ratio of 81:19 ($M_w$ = 250,000 g/mol), $n_D^{25}$ = 1.575);

C Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerizing 72 parts by weight of butadiene and 28 parts by weight of styrene ($n_D^{25}$ = 1.5400, $d_{50}$ = 118 nm);

D Copolymer prepared from 97 parts by weight of MMA and 3 parts by weight of butanediol dimethacrylate ($n_D^{25}$ = 1.4900, $d_{50}$ = 4580 nm).

TABLE

| No. | Components | | | | Impact strength $a_n$/23° C. [kJ/m$^2$] | Optical properties Gloss [45°] | Light transmittance | Stress cracking resistance Fracture [min] |
|---|---|---|---|---|---|---|---|---|
| | A | B | C | D | | | | |
| 1 | 28.0 | 36.0 | 36.0 | — | 42.8 | 120 | ++ | — |
| 2 | 26.0 | 36.0 | 36.0 | 2.0 | 41.6 | 63 | + | — |
| 3 | 23.0 | 36.0 | 36.0 | 5.0 | 40.0 | 52 | + | — |
| 4 | 100 | | | | 11.0 | 125 | ++ | 3 |
| 5 | 98 | | | 2.0 | 10.0 | 60 | + | 2 |

Experiments 1, 4 and 5 are comparative experiments and experiments 2 and 3 are according to the invention.

We claim:

1. Thermoplastic molding material containing a mixture comprising (A) from 15 to 70% by weight of a methacrylate polymer obtained by polymerization of a mixture consisting essentially of (A1) from 90 to 100% by weight, based on (A), of methyl methacrylate and (A2) from 0 to 10% by weight, based on (A), of a $C_1$–$C_8$-alkyl ester of acrylic acid, and (B) from 10 to 50% by weight of a copolymer obtained by polymerization of a mixture consisting essentially of
(B1) from 78 to 88% by weight, based on (B), of a vinylaromatic monomer and
(B2) from 12 to 22% by weight, based on (B), of a vinyl cyanide, and
(C) from 20 to 50% by weight of a graft copolymer, obtained from
(C1) 50 to 80% by weight of a core obtained by polymerization of a monomer mixture consisting essentially of
(C11) from 50 to 100% by weight of a 1,3-diene and
(C12) from 0 to 50% by weight of a vinylaromatic monomer and and
(C2) 20 to 50% by weight of a graft shell obtained by polymerization of a monomer mixture in the presence of the core (C1) consisting essentially of
(C22) from 0 to 60% by weight of a vinylaromatic monomer, with the proviso that the median particle size ($d_{50}$) of the graft copolymer is chosen in the range from 40 to 500 nm, and (D) from 0.5 to 15% by weight of a crosslinked methacrylate polymer obtained by polymerization of a mixture consisting essentially of
(D1) from 80 to 99.5% by weight of a $C_1$–$C_8$-alkyl ester of methacrylic acid,
(D2) from 0 to 15% by weight of a $C_1$–$C_8$-alkyl ester of acrylic acid,
(D3) from 0.5 to 5% by weight of a crosslinking monomer copolymerizable with D1 and D2 and
(D4) from 0 to 10% by weight of a polar momoner selected from the group consisting of methacrylic acid, acrylic acid, hydroxyethyl acrylate, hydroxyethyl methacrylate, dimethylaminoethyl acrylate and dimethylaminoethyl methacrylate, with the proviso that the median particle size ($d_{50}$) of D is chosen in the range from 50 to 80,000 nm, and (E) from 0 to 20% by weight of conventional additives, based on the sum of the components A, B, C and D, where the stated % by weight of A, B, C and D sum to 100 and the difference between the refractive index of the component C and that of the mixture of the components A, B and D or that of the mixture of the components A, B, D and E is less than 0.005.

2. A process for the preparation of the thermoplastic molding material defined in claim 1, wherein
(A) from 15 to 70% by weight of a methacrylate polymer obtained by polymerization of a mixture consisting essentially of
(A1) from 90 to 100% by weight, based on (A), of methyl methacrylate and
(A2) from 0 to 10% by weight, based on (A), of a $C_1$–$C_8$-alkyl ester of acrylic acid, and
(B) from 10 to 50% by weight of a copolymer, obtained by polymerization of a mixture consisting essentially of
(B1) from 78 to 88% by weight, based on (B), of a vinylaromatic monomer
(B2) from 12 to 22% by weight, based on (B), of a vinyl cyanide, and and
(C) from 20 to 50% by weight of a graft copolymer obtained essentially from
(C1) 50–80% by weight of a core obtainable by polymerization of a monomer mixture consisting essentially of
(C11) from 50 to 100% by weight of a 1,3-diene and
(C12) from 0 to 50% by weight of a vinylaromatic monomer and and
(C2) 20–50% by weight of a graft shell obtained by polymerization of a monomer mixture in the presence of the core (C1) consisting essentially of
(C21) from 40 to 100% by weight of a $C_1$–$C_8$-alkyl ester of methacrylic or acrylic acid and
(C22) from 0 to 60% by weight of a vinylaromatic monomer, with the proviso that the median particle size ($d_{50}$) of the graft copolymer is chosen in the range from 40 to 500 nm, and (D) from 0.5 to 15% by weight of a crosslinked methacrylate polymer obtained by polymerization of a mixture consisting essentially of
(D1) from 80 to 99.5% by weight of a $C_1$–$C_8$-alkyl ester of methacrylic acid,
(D2) from 0 to 15% by weight of a $C_1$–$C_8$-alkyl ester of acrylic acid,
(D3) from 0.5 to 5% by weight of a crosslinking monomer copolymerizable with D1 and D2 and
(D4) from 0 to 10% by weight of a polar momoner selected from the group consisting of methacrylic acid, acrylic acid, hydroxyethyl acrylate, hydroxyethyl methacrylate, dimethylaminoethyl acrylate and dimethylaminoethyl methacrylate, with the proviso that the median particle size ($d_{50}$) of D is chosen in the range from 50 to 80,000 nm, and (E) from 0 to 20% by weight of conventional additives, based on the sum of the components A, B, C and D, where the stated % by weight of A, B, C and D sum to 100 and the difference between the refractive index of the component C and that of the mixture of the components A, B and D or that of the mixture of the components A, B, D and E is less than 0.005.

3. A molding formed from a thermoplastic molding material as defined in claim 1.

* * * * *